United States Patent Office 3,284,291
Patented Nov. 8, 1966

3,284,291
ANTIMICROBIAL COMPOSITIONS COMPRISING DITHIOCARBAMIC ACID DERIVATIVES AND METHOD OF USE
Ranajit Ghosh, Bracknell, England, assignor to Imperial Chemical Industries Limited, London, England, a corporation of Great Britain
No Drawing. Original application Aug. 20, 1962, Ser. No. 218,149, now Patent No. 3,232,974, dated Feb. 1, 1966. Divided and this application Aug. 7, 1964, Ser. No. 394,095
Claims priority, application Great Britain, Aug. 31, 1961, 19,653/61
6 Claims. (Cl. 167—30)

This invention relates to dithiocarbamic acid derivatives, to a process for their preparation and to antimicrobial compositions containing them.

This application is a division of my copending application, Serial No. 218,149, filed August 20, 1962, now U.S. Patent 3,232,974.

The invention consists in one aspect of antimicrobial compositions comprising as active ingredient a compound of the formula:

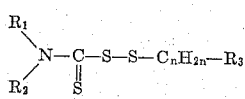

in which $R_1$ and $R_2$ are each a hydrogen atom, an aliphatic, aryl or aralkyl radical, or $R_1$ and $R_2$ together with their adjacent atom constitute a heterocyclic ring; $R_3$ is an aryl radical; and $n$ is 1, 2, 3 or 4, and a carrier for the said active ingredient.

Where $R_1$ or $R_2$ is an aliphatic radical it is preferably a lower aliphatic radical, for example, a methyl, ethyl, propyl or butyl radical; and where $R_1$ and $R_2$ (together with their adjacent nitrogen atom) constitute a heterocyclic radical it can be, for example, a six-member ring, such as piperidine, piperazine or morpholine. The group $R_3$ is conveniently an unsubstituted phenyl radical, though it can if desired contain substituents, for example halogen.

The exact form of the antimicrobial composition depends to a large extent upon the use to which the composition is to be put (for instance as foliage fungicide or seed dressing) and the pathogen which it is wished to control. For example, the compositions can be powders, solutions, dispersions or pastes. Where they are powders they can be ones in which the active ingredient is in admixture with a powder diluent. Where the composition is liquid it can be one in which the active ingredient is dissolved or suspended in a suitable liquid, for example water or a suitably non-phytotoxic organic liquid. The ingredients used with the active ingredient in any of the compositions of this invention can be substances of the type known to the art as being suitable in the formulation of antimicrobial compositions, for example surface-active substances such as wetting and dispersing agents, binders, stickers, corrosion inhibitors and stabilising agents.

The invention also consists in dithiocarbamic acid derivatives of the formula shown above. These dithiocarbamic acid derivatives can be obtained, for example, by a process in which a compound of the formula:

$$X—S—C_nH_{2n}—R_3$$

is reacted with a suitable salt of a dithiocarbamic acid of the formula:

where $R_1$, $R_2$, $R_3$ and $n$ have the meanings given above and X is a chlorine or like halogen atom. Suitable salts of the diothiocarbamic acid are those of sodium, potassium, ammonium or substituted ammonium.

The invention further consists in a method of combating plant pathogens, in which the foliage of a plant susceptible to such pathogens or seed from which the plant can be grown, is treated with a compound or antimicrobial composition of this invention. In particular benzylsulphenyl N:N-dimethyldithiocarbamate has been found to have a useful activity when applied as a seed dressing against *Xanthomonas malvacearum* on cotton.

The invention is illustrated by the following examples:

Example 1

This example describes the preparation of benzylsulphenyl N:N-dimethyldithiocarbamate.

A suspension of sodium N:N-dimethyldithiocarbamate (7.15 g.) in dry benzene (50 cc.) was cooled to about 5° C. and to the cooled suspension there was added a quantity of benzylsulphenyl chloride (previously obtained from benzyl mercaptan, 6.2 g.) dissolved in benzene (75 cc.). The mixture was stirred at about 5° C. for 15 minutes, then at room temperature for 2½ hours. After that the mixture was washed with water and the resulting benzene layer was separated and dried over anhydrous sodium sulphate. The benzene was then removed by distillation and the residue was recrystallised from ethanol yielding benzylsulphenyl N:N-dimethyldithiocarbamate as a crystalline solid, M.P. 85° C.

Example 2

This example describes the preparation of p-chlorobenzylsulphenyl N:N-dimethyldithiocarbamate.

The procedure of Example 1 was repeated, but using p-chlorobenzylsulphenyl chloride (previously obtained from 7.9 g. of p-chlorobenzylmercaptan) instead of the benzylsulphenylchloride of Example 1.

The product, p-chlorobenzyl-sulphenyl N:N-dimethyldithiocarbamate thus obtained, was recrystallised from ethanol yielding a crystalline solid, M.P. 92–93° C.

Example 3

This example describes the preparation of benzylsulphenyl N:N-diethyldithiocarbamate.

A suspension of sodium N:N-diethyl dithiocarbamate (8.6 g.) in benzene (100 cc.) was stirred and heated under reflux whilst there was slowly run into it a solution in benzene (60 cc.) of benzylsulphenylchloride (previously obtained from 6.2 g. of benzylmercaptan). After all the benzylsulphenylchloride had been added, the resulting mixture was refluxed for 15 minutes and then allowed to cool to the room temperature. The mixture was then washed with water, the resulting benzene layer was removed and dried over anhydrous sodium sulphate. On removal of the benzene by distillation, benzyl sulphenyl N:N-diethyldithiocarbamate was obtained as a viscous oil, $n_D^{17}$ 1.6395.

Example 4

This example describes the preparation of benzylsulphenyl N-methyl-N-phenyldithiocarbamate.

Benzylsulphenylchloride (previously obtained from 6.2 g. of benzyl mercaptan) was dissolved in dry benzene (50 cc.) and the benzene solution was gradually added to a boiling suspension of sodium N-methyl-N-phenyldithiocarbamate (10.3 g.) in dry benzene. After all the benzylsulphenylchloride had been added the mixture was stirred and refluxed for 15 minutes, allowed to cool to room temperature and the desired product of the reaction was isolated from the benzene solution by the procedure given in Example 1. In this way benzylsulphenyl N-methyl-N-phenyldithiocarbamate was obtained as a crystalline solid, M.P. 85° C.

Example 5

This example describes the preparation of benzylsulphenyl N:N-pentamethylenedithiocarbamate.

The procedure of Example 1 was repeated, but using sodium pentamethylenedithiocarbamate (9.2 g.) instead of the sodium N:N-dimethyldithiocarbamate of that example.

The product, benzylsulphenyl N:N pentamethylenedithiocarbamate, when recrystallised from ethanol was obtained as a crystalline solid, M.P. 100° C.

Example 6

This example describes the preparation of benzylsulphenyl N:N-diisopropyldithiocarbamate.

The procedure of Example 3 was repeated, but using sodium N:N-diisopropyldithiocarbamate (20 g. suspended in 100 cc. benzene) and a solution in benzene (150 cc.) of benzyl sulphenylchloride, previously obtained from 12.4 g. benzylmercaptan, instead of the reactants of Example 3. The product, benzyl sulphenyl N:N-diisopropyldithiocarbamate, when re-crytsallised from ethanol was obtained as a crystalline solid, M.P. 77° C.

Example 7

This example describes the preparation of benzylsulphenyl N:N-3-oxapentamethylenedithiocarbamate.

A suspension of sodium 3-oxa-pentamethylenedithiocarbamate (18.5 g. in benzene (100 cc.) was stirred and heated under reflux while there was added to it a solution in benzene (150 cc.) of benzylsulphenyl chloride (previously obtained from 12.5 g. of benzylmercaptan). After refluxing for two hours, the mixture was cooled and the product was isolated according to the procedure of Example 1. The product was recrystallised from ethanol and benzylsulphenyl 3-oxa-pentamethylene dithiocarbamate was obtained as a colourless crystalline solid, M.P. 102° C.

Example 8

This example describes the preparation of bis-benzylsulphenyl piperazine-1,4-bis-carbodithioate.

A suspension of dry sodium piperazine-1,4-bis-carbodithioate (14.1 g.) (prepared from piperazine, carbondisulphide and sodium hydroxide) in dry benzene (50 cc.) was cooled to 5° C. and to the cooled mixture there was added a quantity of benzylsulphenyl chloride (previously obtained from benzylmercaptan, 12.4 g.) dissolved in benzene (75 cc.). The reaction mixture was then stirred for ½ hour at 5° C. and then for 2½ hours at the room temperature. The mixture was then filtered and the residue was treated with water. The water-insoluble residue was collected, dried and recrystallised from benzene. This gave bis-benzylsulphenyl-piperazine-1,4-bis-carbodithioate, M.P. 174° C.

Compounds obtained as products of the examples have been found to show antimicrobial activity against a number of plant pathogens; for example as foliage fungicides against *Plasmopara viticola*, *Phytophthora infestans*, *Piricularia oryzae* and *Botyrtis fabae*. In particular, benzylsulphenyl N:N-dimethyldithiocarbamate obtained as product of Example 1 has been found to be active in seed dressings against the bacterial disease *Xanthomonas malvacearum* on cotton.

What I claim is:

1. An antimicrobial composition comprising, as the active ingredient, an effective amount of a compound of the formula:

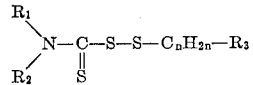

in which $R_1$ and $R_2$ are selected from the group consisting of hydrogen, alkyl of up to four carbon atoms, monocyclic carbocyclic aryl and the member which represents the atoms necessary to complete a heterocyclic ring with the adjacent nitrogen atom selected from the group consisting of piperidine, piperazine and morpholine; $R_3$ is monocyclic carbocyclic aryl; and $n$ is an integer from 1 to 4; and a carrier for the said active ingredient.

2. A composition according to claim 1 where the active ingredient is a compound in which $n$ is 1, $R_1$ and $R_2$ are lower alkyl and $R_3$ is phenyl.

3. An antimicrobial composition according to claim 1 wherein the active ingredient is benzylsulphenyl N:N-dimethyldithiocarbamate.

4. A method of combating plant pathogens which comprises treating the area subject to said pathogens with a compound of the formula:

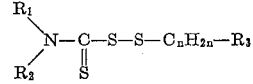

in which $R_1$ and $R_2$ are selected from the group consisting of hydrogen, alkyl of up to four carbon atoms, monocyclic carbocyclic aryl and the member which represents the atoms necessary to complete a heterocyclic ring with the adjacent nitrogen atom selected from the group consisting of piperidine, piperazine and morpholine; $R_3$ is monocyclic carbocyclic aryl; and $n$ is an integer from 1 to 4.

5. A method of combating *Xanthomonas malvacearum* on cotton, which comprises treating cottonseed with a compound of the formula:

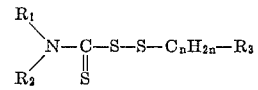

in which $R_1$ and $R_2$ are selected from the group consisting of hydrogen, alkyl of up to four carbon atoms, monocyclic carbocyclic aryl and the member which represents the atoms necessary to complete a heterocyclic ring with the adjacent nitrogen atom selected from the group consisting of piperidine, piperazine and morpholine; $R_3$ is monocyclic carbocyclic aryl; and $n$ is an integer from 1 to 4.

6. A method according to claim 5 in which the cottonseed is treated with benzylsulphenyl N:N-dimethyldithiocarbamate.

References Cited by the Examiner

UNITED STATES PATENTS

| | | | |
|---|---|---|---|
| 2,368,515 | 1/1945 | Blake | 260—247.1 |
| 2,792,394 | 5/1957 | Himel et al. | 260—247.1 |
| 2,897,110 | 7/1959 | Scott | 167—22 |
| 2,911,335 | 11/1959 | Gilbert | 167—22 |
| 2,941,879 | 6/1960 | Goodhue | 260—247.1 X |
| 2,992,091 | 7/1962 | Harman | 71—2.6 |
| 3,054,792 | 9/1962 | Howard et al. | 260—247.1 |
| 3,070,599 | 12/1962 | Hendry et al. | 260—247.1 |

FOREIGN PATENTS 158,591   9/1954   Australia.

JULIAN S. LEVITT, *Primary Examiner.*

GEORGE A. MENTIS, *Assistant Examiner.*